United States Patent [19]

Ball

[11] Patent Number: 4,668,358

[45] Date of Patent: May 26, 1987

[54] METHOD AND APPARATUS FOR USE IN SURFACE TREATMENT OF CONVEYOR SUPPORTED WORKHOLDERS

[75] Inventor: Richard C. Ball, Lansing, Mich.

[73] Assignee: Motor Wheel Corporation, Lansing, Mich.

[21] Appl. No.: 863,163

[22] Filed: May 14, 1986

[51] Int. Cl.[4] .................... B05C 13/00; B65G 49/02; C25D 13/04; C25D 17/08
[52] U.S. Cl. .............................. 204/150.2; 204/181.6; 204/181.7; 204/300 EC; 204/202; 118/47; 118/70; 118/639
[58] Field of Search ............... 204/180.2, 181.6, 181.7, 204/300 EC, 202; 118/47, 70, 639

[56] References Cited

U.S. PATENT DOCUMENTS

| | | | |
|---|---|---|---|
| 3,669,870 | 6/1972 | Boost et al. | 204/300 EC |
| 3,830,196 | 8/1974 | Guttman et al. | 118/70 |
| 4,005,000 | 1/1977 | Kvasku | 204/180.2 |
| 4,263,122 | 4/1981 | Urquhart | 204/300 EC |
| 4,520,755 | 6/1985 | Inukai et al. | 118/629 |

Primary Examiner—Howard S. Williams
Attorney, Agent, or Firm—Barnes, Kisselle, Raisch, Choate, Whittemore & Hulbert

[57] ABSTRACT

System, apparatus, circuitry and method for improving electrical conductivity of contact between an electrically conductive workpiece and an electrically conductive work carrier while the workpiece is supported on the work carrier prior to moving the workpiece through an electrocoating treatment zone while supported by the work carrier. The workpiece is suspended on the carrier prior to entry into the zone bath, and then carried past a series of electrically conductive wipers during transit on the carrier toward said zone to cause successive contact with each wiper as the workpiece travels thereby. Each wiper is energized with a high voltage from a capacitor discharge power supply prior to contact with said workpiece, and the power supply is discharged from the wiper into said workpiece as a result of contact therebetween during transit of the workpiece past the wiper. This produces a successive series of spark arc discharges across the workpiece-carrier interface prior to entry of the workpiece into the zone for either graphitizing or burning off of any coating material on the work carrier creating a resistive barrier between the workpiece and carrier to thereby improve electrically conductivity therebetween during subjection thereof to the subsequent electrocoating treatment.

22 Claims, 12 Drawing Figures

METHOD AND APPARATUS FOR USE IN SURFACE TREATMENT OF CONVEYOR SUPPORTED WORKHOLDERS

FIELD OF THE INVENTION

This invention relates to the art of surface treatment of conveyor supported workpieces, and more particularly to improvements in method, system, circuitry and apparatus employed in the coating of electrically conductive objects by electrically induced deposition of an organic coating material from a dispersion thereof in an aqueous bath.

BACKGROUND OF THE INVENTION

In electrodeposition of organic coatings an object to be painted is immersed in an aqueous bath comprising a dispersion of particles of the film-forming, organic material to be electrodeposited and serve as a first electrode of an electrodeposition cell. A second electrode, which is usually a separate consumable conductor, is immersed in the coating bath and hence is in electrical contact with the bath, and is spaced apart from the object to be coated. These electrodes are in electrical connection with opposite terminals of a direct current power source. A difference of electrical potential above the threshold deposition voltage of the coating material to be deposited, e.g. 50 to 1,000 volts, more commonly between about 100 and about 300 volts, is maintained between the electrodes, a direct current of electrical energy is passed between such electrodes and through the bath, causing the coating material to deposit upon the object to be coated. Such deposition is terminated by the increasing electrical resistance of the resultant coating, removal of the object from the bath, or by any other break in the electrical circuit which comprises the aforementioned electrodes, the electrolyte bath therebetween, the power source and conduction means providing electrical connection between such electrodes and the power source. The coated object is removed from the bath, given a water rinse, and the coating is polymerized, commonly by baking.

In most manufacturing installations where this method of painting is employed, the coating is effected in a continuous process wherein the object to be coated is carried over to the coating bath while suspended from a conveyor from which it may or may not be electrically insulated, an electrical contact is established between the object to be coated and the appropriate lead from the power source (the negative lead in the case of cathodic deposition), the object still supported by the conveyor is immersed in the bath, coated, and then withdrawn from the bath by the conveyor.

Since a continuous stream of such objects pass through the bath to be coated, readily attachable and detachable conveyor hanger connector means are advantageously employed to secure electrical connection between the object to be coated and the proper conductor lead from the power source. With large objects, the electrical current drawn in the coating cycle is necessarily high. Any poor conductor of electric current interposed between the object and the conductor leading to the power source adds resistance, produces heat, and lowers the intended coating voltage. If such resistance is sufficiently high, it can prevent coating altogether. For these reasons, it is important that the detachable connector means be constructed and arranged in a manner such that the area of electrical connection between the object and the conveyor work-carrying conductor or hanger connector through which electrical connection is established with the power source be as free as possible of non-conductive or poorly conductive materials. Maintaining a clean contact area is made difficult by the connecting conductor being of the same polarity as the object to be coated. Those portions of the connecting conductor left exposed to the bath become coated with an insulating film each time the connector is used. In installations where this connecting conductor is not removed from the object until after baking, the problem becomes even greater.

The aforementioned problem of paint build-up on conveyor hangers and the like in electrodeposition painting as well as in electrostatic painting and enameling appears to be relatively well recognized in the art. The unexpired U.S. Pat. Nos. to Witte 4,069,790, Guttman et al 3,830,196, Haney et al 3,830,716, Johnson 3,575,832, Igras et al 3,509,036, and Urquhart 4,263,122 teach various diverse approaches to solving this problem. Witte and Guttman et al both burn off the paint adhering to the supporting element to carbonize or reduce the paint to a coking residue, coupled with a water and/or compressed air flush to blast away such residues from the supporting elements. Haney et al teaches the cleaning of a continuous type electrocoating conveyor belt by a "reverse polarity cleaning" operation requiring, inter alia a second electrode positively charged to a higher positive potential than the conveyor belt. Haney et al also discloses another approach to the problem, namely making the conveyor belt or article support from a material that exhibits a "rectification characteristic", i.e. materials are electrically conductive and will carry a charge to an article carried on the support while at the same time will not themselves become coated. Johnson interposes a conductive foil shield cup between the support so that the shield becomes coated and not the support. Similarly, Igras shields the conductive contact of a support with a resilient shield to prevent the paint from coating the contact during transit through the electrocoating process. Urquhart discloses, inter alia, a trolley clean out obstruction fixed on the rail adjacent the path of travel of the trolley yoke arms and upstream of the grounding shoe for dislodging foreign matter clinging thereto. However, each of these prior approaches suffers from certain disadvantages in terms of equipment, labor and/or material cost, lack of reliability or efficiency in processing, and/or adaptability to various diverse systems.

OBJECTS OF THE INVENTION

Accordingly, it is one object of the present invention to improve product quality control and promote operational efficiency in electrocoating process by providing improved method and means for creating, maintaining and insuring good electrical contact between the parts to be coated and the associated electrically conductive work carrier.

Further objects of the present invention are to provide improved method and apparatus of the above character which: (1) provides a relatively central apparatus set up requiring no change in existing work carrier or hanger construction; (2) eliminates the need for an in-line burn-off oven stationed along the coating line; (3) is readily adaptable to electrocoating conveyor systems having only one-way transit through the coating bath; (4) greatly reduces the need for cleaning of the hangers, baskets or other work carriers; and (5) does not require special hangers or devices for modifications to the hangers to overcome the paint deposition problem.

BRIEF DESCRIPTION OF THE DRAWINGS

Other objects, as well as features and advantages of the present invention will become apparent from the following detailed description, appended claims, and accompanying scaled drawings, wherein:

SUMMARY OF THE INVENTION

In general, the present invention provides an improved method, system, circuit and apparatus for solving problems related to the build up of paint on the conveyor hangers, racks, baskets or other work carriers employed in continuous type electrocoating processes by impressing a high voltage on the suspended workpiece prior to entry into the electrocoating bath. This causes an arc discharge between the workpiece and conveyor basket which carbonizes or burns away the coating on the basket in the area thereof juxtaposed to the workpiece. In the process of the invention, the arc discharge or "sparking" onto the paint-coated surface of the hanger is of predetermined magnitude to effect "blowing-off" the coating as well as burning through the same, and is effective in and of itself to leave a bare metal (conductive) surface, (i.e. paint-free) exposed on the basket or to cause whatever coating build-up remains to be more electrically conductive. Hence, the workpiece can make good electrical contact with the conductive metal of the basket to insure good electrical conduction, in the subsequent electrocoating circuit, between the workpiece to be coated and the basket conductor leading to the electrocoating power source. The invention includes in one embodiment a paddle-to-wheel contact apparatus coupled to a capacitor spark discharge power supply which makes contact with a workpiece while traveling along a conveyor prior to immersion in the electrocoating bath to impress a predetermined number of high voltage contacts through the workpiece and the carrier on which it is suspended to produce a predetermined number of spark discharges therebetween, as may be required by the conditions of paint build up on the carrier, in order to insure break through of this adverse resistive coating on the conveyor hanger or work carrier. Alternatively, the paddle may make contact directly with the hanger in a predetermined workpiece support zone to clear off paint thereon by spark discharge.

DETAILED DESCRIPTION OF PREFERRED EMBODIMENTS OF THE INVENTION

Figure 1:
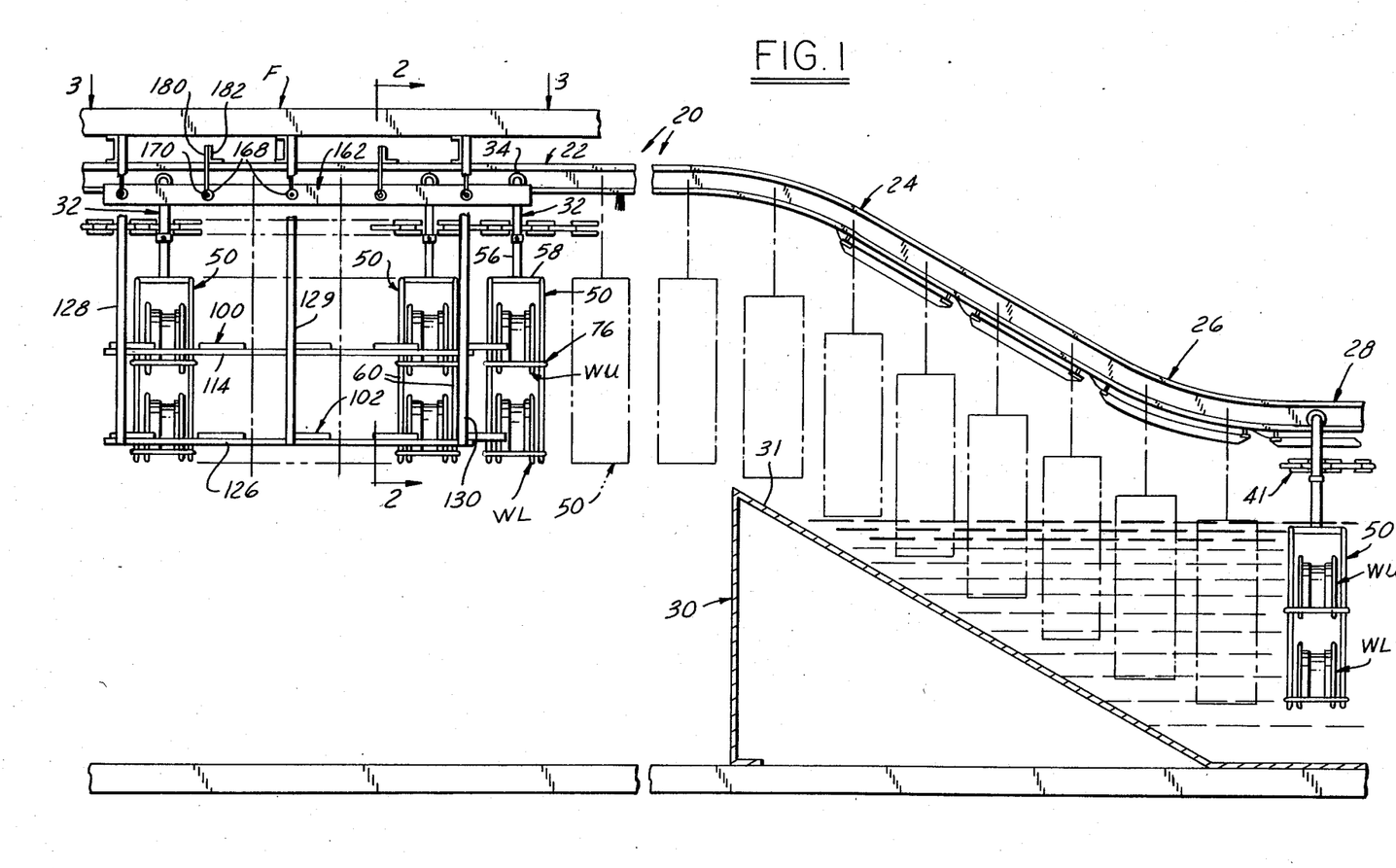
FIG. 1 is a fragmentary semi-schematic elevational view of a monorail conveyor system of an electrocoating processing line illustrating one embodiment of the present invention.

Referring in more detail to the accompanying drawings, FIG. 1 illustrates one preferred, but exemplary, embodiment of the invention illustrated in combination with a conventional I-beam monorail conveyor track 20 of the type disclosed in U.S. Pat. No. 4,263,122, which is incorporated herein by reference. Thus, conveyor track 20 has a first horizontally extending section 22, a downwardly curved section 24, a reversely curved, but still downwardly extending, section 26 and a lower elevation, second horizontally extending section 28. A conventional electrocoat tank 30 is designated beneath track sections 24,26,28 and has an outwardly and upwardly diverging entrance end 31 disposed beneath sections 24,26. It is to be understood that tank 30 is preferably symmetrical with an exit end (not shown) disposed oppositely from end 31, and upwardly curved exit sections of track are also provided (not shown) corresponding to sections 24 and 26 which are arranged to elevate the parts out of the bath and transport the same onward for further processing and unloading, as may be conventional in conveyorized electrocoating systems.

Figure 2:
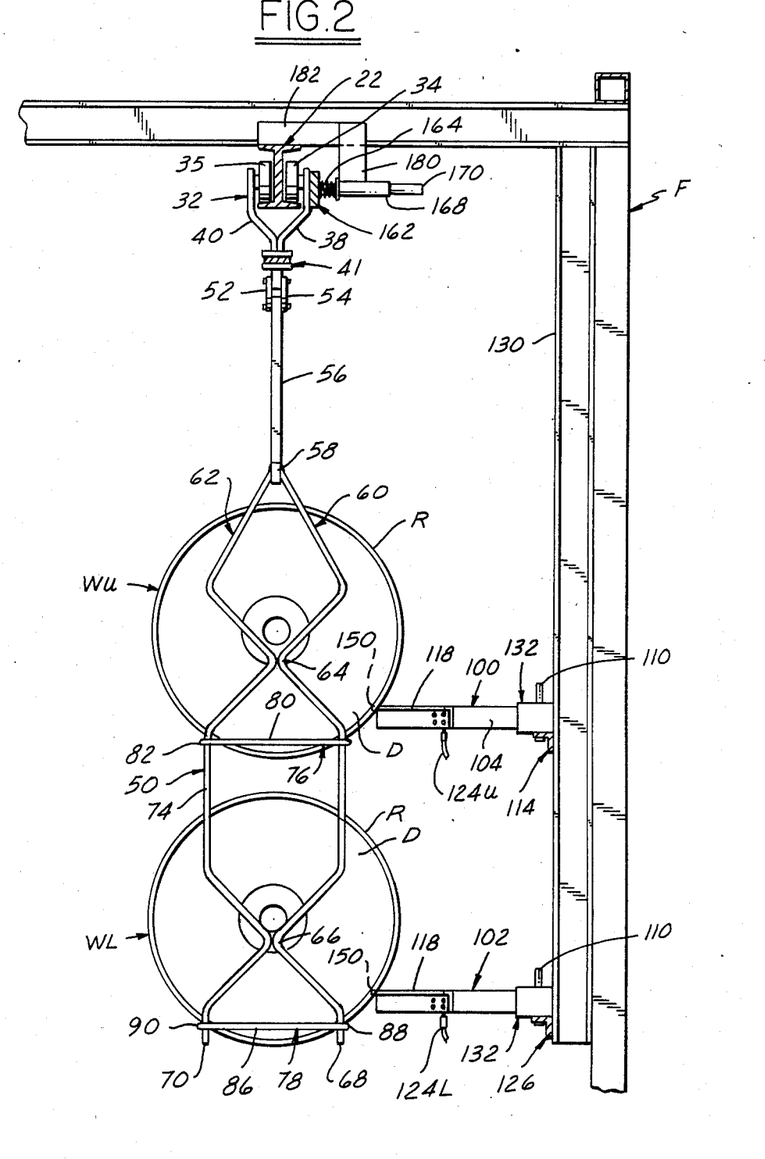
FIG. 2 is a vertical cross-sectional view taken on the line 2—2 of FIG. 1.
Figure 3:
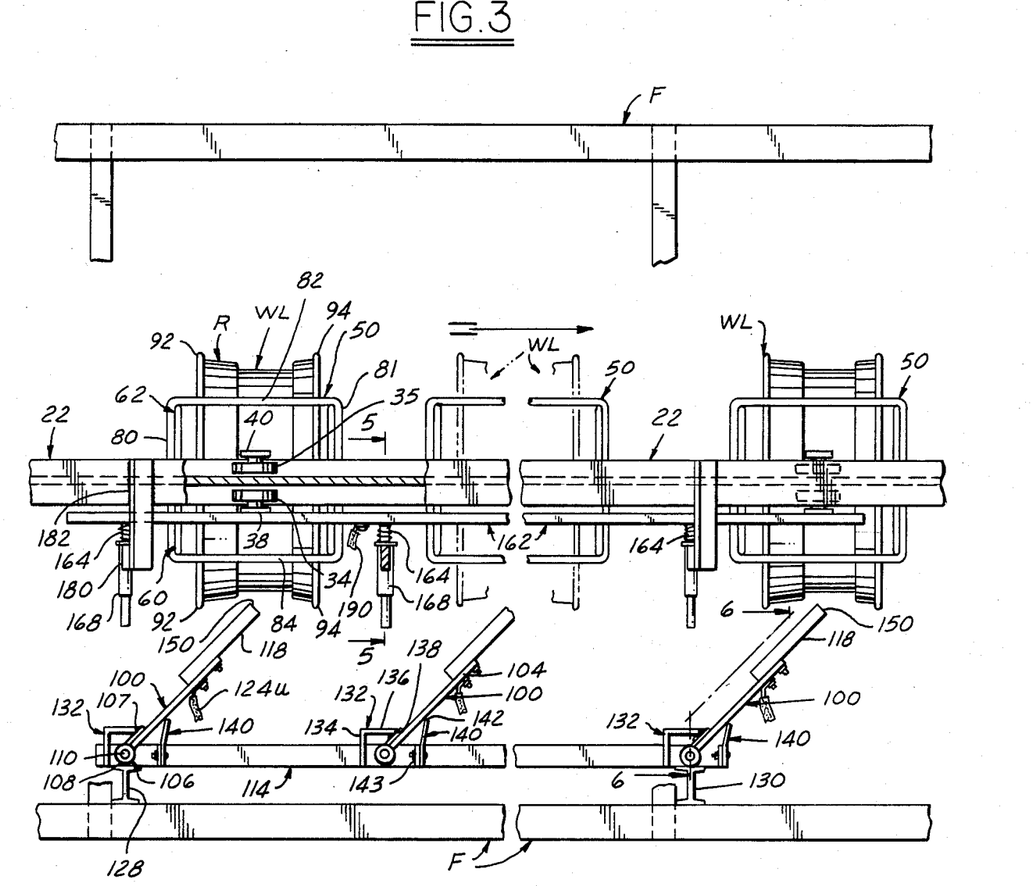
FIG. 3 is a fragmentary top plan view taken on the line 3—3 of FIG. 1.
Figure 5:
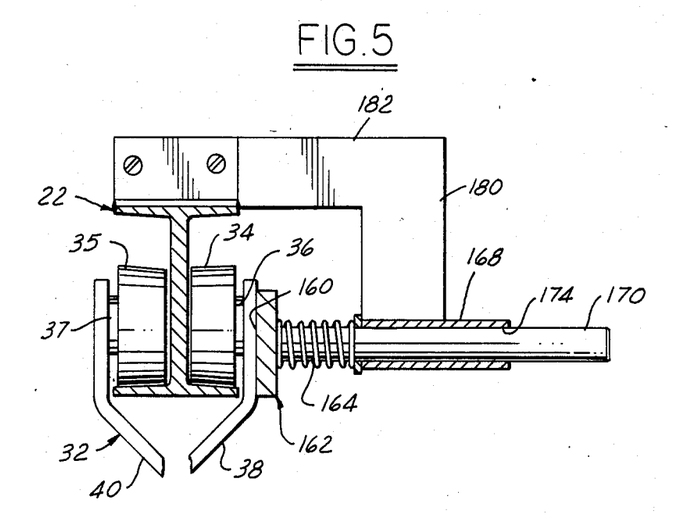
FIG. 5 is a vertical cross sectional view taken on the line 5—5 of FIG. 3.

As best seen in FIGS. 2, 3 and 5, monorail section 22, as well as sections 24,26,28, each comprise I-section beams joined end to end to serve as a dual trackway for a conventional trolley assembly 32. Trolley 32 comprises a pair of wheels or rollers 34,35 (FIGS. 3 and 5), each journaled by ball bearings on associated axles stubs 36 and 37 (FIG. 5), respectively, which in turn are supported from trolley arms 38 and 40, respectively. These arms merge and are joined together by their lower ends so as to protrude through a link of a conventional conveyor chain 41 so as to drivingly interconnect the trolleys for propulsion of the same in tracking relation along the monorail 20. The parts to be electrocoated in tank 30 are supported from each trolley by a work carrier, which may be a basket, customized framework or hanger as conventionally used in the art. In the embodiment illustrated herein the workpieces consist of conventional steel automotive passenger vehicle wheels supported in pairs, one above the other, on a carrier 50 suspended by straps 52 and 54 from the lower end of trolley arms 38,40 (FIG. 2).

As best seen in FIGS. 1, 2 and 3, each carrier 50 comprises a bar 56 bolted at its upper end to straps 52,54 and welded at its lower end to the center of a horizontal bar 58. Each side of carrier 50 consists of a pair of steel rods 60 and 62 bent into a zig-zag formation as best seen in FIG. 2, with the upper ends of the rods converging at a welded junction with the associated end of bar 58. Rods 60 and 62 abut, and are are welded to one another, at bends 64 and 66, and terminates at lower ends 68 and 70 which are spaced apart the same distance as intermediate straight vertical portions 72 and 74. Each carrier 50 has a pair of workpiece support rods 76 and 78 formed into a rectangular or square loop and welded to the side frame rods 60 and 62 at two vertically spaced locations. Thus, upper support rod 76 extends horizontally between rod portions 72 and 74 to provide two frame braces 80 and 81 (FIG. 3) and extends horizontally from the front to the rear sides of the carrier (parallel to workpiece travel) to provide work two support portions 82 and 84. Rod 76 is welded at each of the four right angle corners to the associated rod of the side frame rods. Likewise, lower support rod 78 provides frame braces 86 and 87 and work support portions 88 and 90.

Each carrier 50 is suitably dimensioned, and work supports 76 and 78 suitably vertically spaced, so as to support a pair of vehicle wheels one above the other, designated as the lower wheel WL and the upper wheel WU in the drawings. As best seen in FIGS. 2 and 3, wheels WL, WU are conventional and may consist of a rolled steel rim R and a central stamped steel disc D. Referring to FIG. 3, wherein the upper wheels WU have been removed to help illustrate carrier 50, rim R has the usual axially spaced tire bead retaining flanges 92 and 94 which define the maximum outside diameter of the wheel. Between flanges 92 and 94 rim R has the usual tire bead seats and drop center well configuration. With this workpiece suspension arrangement, each wheel WU, WL is individually loaded into the carrier 50 by rotating the wheel on the cross portions 82, 84 and 88, 90 of the associated support rods 76 and 78 so that the rim flanges 92 and 94 of each wheel each contact the carrier at two points, and hence the wheel has a total of four contacts. These rods contact points of each rim flange are typically spaced about 90° apart circumferentially along the rim flange, depending upon wheel diameter, as will be best understood by comparing FIG. 2 and FIG. 3. Carrier 50 is designed so that there is a relatively large side clearance between the sides of the wheel and the flanking sides 60, 62 of the carrier to facilitate loading and unloading of the wheel. Hence the dual points of contact of each rim flange 92 and 94 with support rods 82, 84 or 88, 90 will normally vary over a range of a few inches along the support rods, from wheel to wheel, as the wheels are successively loaded onto and off of a given carrier 50.

In accordance with the conventional electrocoating conveyor practice, monorail 20 is made of steel or other electrically conductive material and in a cathodic system may serve as the main ground conductor connected to the ground side of the system power supply with respect to the electrocoating processing occurring in the electrocoat tank 30 with which monorail sections 24, 26, 28 are associated. Alternatively, the trolley wheels and/or monorail may be isolated from the grounding circuit path and a grounding shoe or cable in contact with the trolley hanger structure serves as the main ground return contactor, as set forth in more detail in the aforementioned U.S. Pat. No. 4,263,122.

In accordance with the present invention, the upstream horizontal section 22 of monorail 20 may, if desired, be electrically isolated from the downstream sections 24, 26 and 28 by conventional insulator interconnecting joint structures (not shown), and monorail section 22 may also be electrically insulated from its associated support structure since the same does not form a circuit component in the circuitry system of the present invention.

Figures 6, 7:
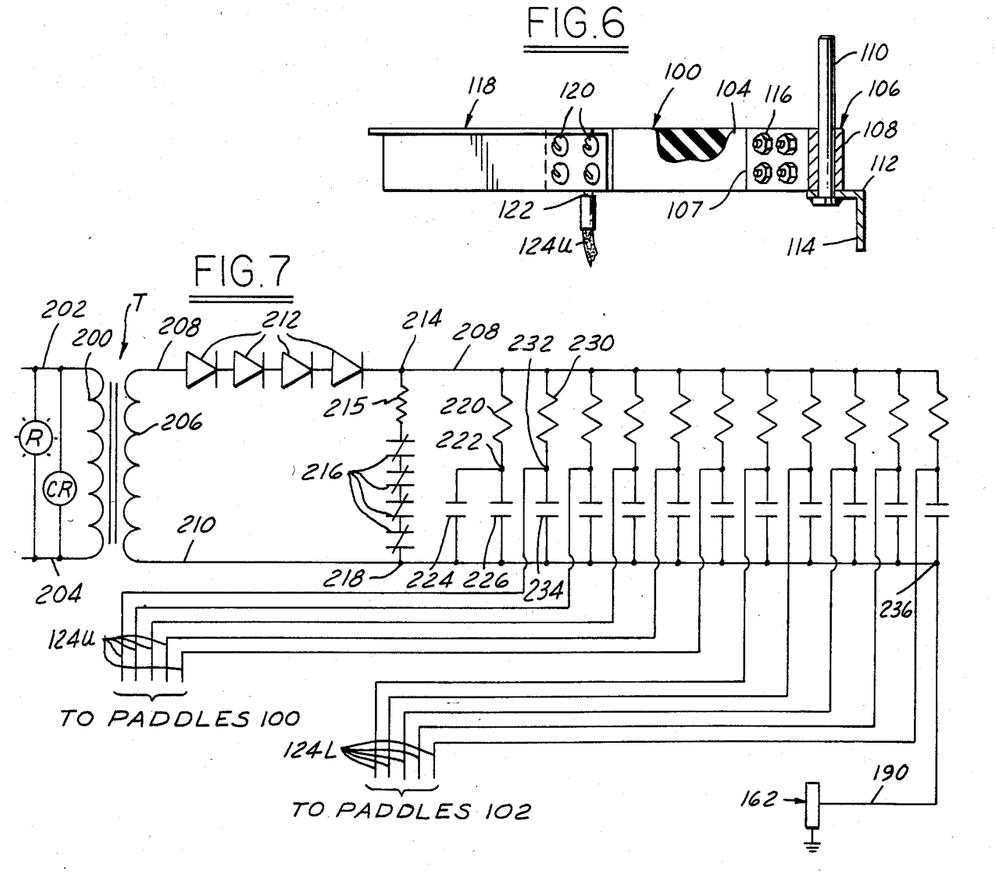
FIG. 6 is a vertical cross sectional view taken on the line 6—6 of FIG. 3.
FIG. 7 is a schematic circuit diagram illustrating the power supply portion of the electrical workpiece-carrier contact cleaning system and circuitry of the present invention.

In accordance with a principal feature of the present invention, a series of electrically conductive, spring-biased paddles 100 and 102 are mounted on the conveyor frame work in two vertically spaced rows respectively adjacent the paths of travel of the workpieces WU and WL beneath monorail section 22. Referring to FIG. 6 as well as FIG. 3, each of the paddles 100 and 102 of the upper and lower sets of paddles are identical and comprise an insulating arm 104 made of suitable electrically non-conductive material, such as Plexiglas or the like, supported for pivotal motion in a plan parallel to work travel by a pintle 106 having a journal sleeve 108 slidably received by a pintle pin 110. Pin 110 in turn is inserted upwardly through a hole in the horizontal flange 112 of an angle iron mounting rail 114. The inner end of arm 104 is detachably secured by fasteners 116 to the leaf 107 of pintle 106. Arm 104 carries at its outboard end a wiper plate 118 made of electrically conductive material, for example mild sheet steel. Plate 118 is detachably secured to arm 104 by fasteners 120, one of which may be used to also secure the connector lug 122 of an insulated conductor wire 124 so as to establish electrical connection between wiper plate 118 and conductor 124.

As best seen in FIGS. 1, 2 and 3, the upper and lower paddle support rails 114 and 126 are welded to upright I beams 128, 129 and 130 of the conventional conveyor support frame work, designated F. Each paddle 100 and 102 is constrained to swing in a horizontal plane through an arc of about 20°, one end limit of the arc being determined by a positive stop bracket 132, comprising a piece of angle iron having one leg 134 welded at its lower edge to the upper surface of the associated rail 114, 126, and its other leg 136 extending parallel to work travel so as to abut at its free edge 138 against the surface of arm 104. Each paddle 100 and 102 is spring biased against stop bracket 132 by a contilever-mounted coil spring 140 having its free end edge 142 in sliding contact with the opposite face of arm 104. Spring 140 is secured at its affixed end to an upright bracket 143 welded to the associated rail 114, 126. Preferably, spring 140 is selected to apply just enough biasing force to maintain its paddle against stop 132 until passage of a workpiece, and to gently return the paddle to its stop.

Figure 4:
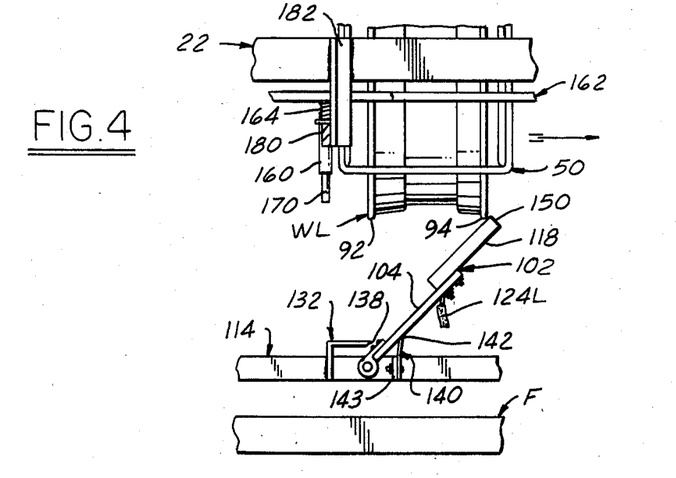
FIG. 4 is a fragmentary top plan view of a portion of the apparatus illustrated in FIG. 3 illustrating one of the workpieces of FIG. 3 shifted in position relative to that shown in FIG. 3.

Referring to FIGS. 1 through 4, paddles 100 and 102 are dimensioned and positioned such that the outboard free edge 150 of each wiper 118 protrudes slightly into interference relationship with the traveling workpieces WU, WL when paddles 100, 102 are yieldably biased to their stop end limit of travel, which is the position of the paddles shown in FIGS. 2 and 3. Preferably, this interference overlap of wiper-to-wheel is slightly less than the distance, radially of the wheels, from the junction of the wheel tire bead seats with the associated rim flanges 92 and 94. Hence the free ends 150 of the wipers 118 preferably are spaced clear of the bead seats and drop center well of each wheel during travel of the wheels past the paddles 100, 102. As each wheel successively passes by each paddle 100 or 102 in its associated row, the leading rim flange 94 will first strike wiper 118 adjacent its edge 150, as best seen in FIG. 4, and then as it slides along wiper 118 it will deflect the paddle inwardly toward its support rail against the bias of spring 140. Once flange 94 has traveled past and clear of the free wiper edge 150, the paddle will spring back to its stop limit, as shown in FIG. 3. As the wheel continues moving along its travel path, its trailing rim flange 92 will similarly contact wiper 118 and deflect it inwardly toward the rail until clear of wiper edge 150, whereupon the paddle once again springs back to its outermost position against stop bracket 132. In one working embodiment of the present invention, employing five paddles 100, 102 in each of the upper and lower rods each wheel as it travels past the associated paddle array will be contacted a total of ten times by paddle strikes against its dual rim flanges. Since at this point the wheels have a bare metal surface in relatively clean condition, and the metal surface of wipers 118 is likewise maintained clean and bare by repetitive wheel contacts, each strike of a paddle against a rim flange and the transit of the flange along the wiper surface establishes a good electrically conductive contact therebetween.

When the electrocoating system is employed to electrocoat wheels varying in diameter say from 13 to 16 inches, paddles 100 and 102 are mounted on beam 130 as shown in FIG. 2, i.e., just above the elevation of the basket rods 84 and 88 so as to be struck by the wheel rim flanges of the various diameters in a zone which minimizes swinging movement of the paddles while accommodating such varying wheel sizes.

Referring to FIGS. 1-5, the other, opposite polarity electrical main contact of the spark discharge system is established through a main bus or ground bar 162. Each work carrier 50 throughout its transit along and past the rows of paddles 100 and 102 slidably engages a wiper face 160 of bus bar 162. Bus bar 150 is supported by five support rods 164 welded at their free ends to the bus bar and equally spaced therealong (FIG. 1). Each rod 164 is slidably received in a sleeve bushing 166 carried within a support tube 168 (FIG. 5). Rod 164 has a reduced diameter shaft 170 which extends coaxially of the rod from its rear face 172 through an opening 174 in the rear wall 176 of tube 168. A coil compression spring 178 encircles shaft 170 within bushing 166 and abuts at its opposite ends surfaces 172 and 176 to bias support rod 164 outwardly of tube 168 toward the conveyor monorail 22. Tube 168 is affixed to and supported by a hanger strap 180 which in turn is carried by a hanger bracket 182 welded to the top flange of monorail 22. Monorail 22 in turn is welded to the underside of the horizontal stringers of the frame work F, as best seen in FIGS. 1 and 2.

The opposite longitudinal ends of bus bar 162 extend somewhat beyond the distance occupied by five successive trolleys 32 such that each of their trolley arms 38 successively come into sliding engagement with bus surface 160 slightly in advance of entering the associated row of paddles 100, 102, and then remains in continuous sliding engagement with bar 162 until its associated carrier 50 and workpiece WU or WL have traveled past the last paddle 100 or 102 in its associated row. Hence, there is good, clean electrical contact between trolley 32 and bus bar 162 throughout transit past the paddle rows for grounding the associated carrier 50. A heavy duty insulated electrical conductor 190 (shown only in FIG. 3) is electrically and mechanically connected to the outer face of bus bar 162 at a suitable location therealong to provide the main ground lead to the spark discharge circuitry to be described hereinafter.

In accordance with another feature of the present invention, a heavy duty, spark discharge power supply circuit and system is provided as shown schematically in FIG. 7. This system includes a power transformer T having a primary winding 200 coupled across the output leads 202 an 204 of a suitable electrical power source, such a conventional 117 volt, 60 cycle alternating current power supply controlled by a main power switch (not shown). The secondary winding 206 of transformer T has a suitable number of turns to step up the incoming voltage to a suitable value, for example 1,400 volts, the opposite ends of winding 206 being connected to main circuit positive and negative conductor leads 208 and 210. Four rectifier diodes 212 are coupled in series with one another in lead 208 and are connected at junction 214 to a branch safety discharge circuit containing a limiting resistor 215 and four normally closed relay contacts 216 all connected in series and with one another and across leads 208 and 210 at a second junction 218 with lead 210. Relay contacts 216 are biased to be normally closed and are switched to an open circuit state when an associated relay coil CR, coupled across the power leads 202 and 204, is energized by throwing the main power switch to an on condition, and vice versa.

A branch circuit filter section is also coupled across leads 208 and 210 and consists of a resistor 220 connected at one end of lead 208 and its other terminal to the junction 222 of a pair of parallel capacitors 224 and 226, which in turn are connected at their other terminals to lead 210. Filter 220-226 serves to reduce the level of "noise" (voltage spikes) returned to the incoming line 202-204 during operation of the "zapper" (capacitor discharge) circuit so as to help prevent such noise from adversely affecting any other equipment on the same power circuit.

The capacitor discharge circuitry of the system in the particular exemplary embodiment illustrated herein consists of a bank of ten capacitor discharge circuit branches connected in parallel across leads 208 and 210 each of which is preferably identical and therefore only the first will be described. Each such capacitor discharge circuit branch consists of a resistor 230 having one terminal connected to line 208 and the other terminal connected to a junction 232 with one terminal of a capacitor 234, the opposite terminal of which is connected to lead 210. The paddle power lead 124 U of the first one of the upper row of paddles 100 is connected at junction 232, between resistor 230 and capacitor 234, the opposite end of lead 124 U being connected to wiper 118 of the first upper paddle 100. The first five capacitor discharge circuit branches are thus successively individually connected with each of the five upper paddle conductors 124 U. Likewise, the second five capacitor discharge circuit branches are coupled individually in the same manner to the power leads 124 L connected to each of the lower paddles 102 as described previously. Bus bar 162 is connected by lead 190 at junction 236 to the common ground trunk line 210, and is also earth grounded by Framework F.

In one working embodiment of the invention, the following circuit component values are utilized:
Rectifier Diodes 213: 1,000 peak inverse voltage; 1 Ampere
Resistor 215: 270 Kilo Ohms; 1 Watt
Resistor 220: 2 Kilo Ohms; 50 Watts
Resistor 230: 25 Kilo Ohms; 225 Watts Capacitors 224 and 226, as well as the ten capacitors 234: 2 Micro Farads; 5,000 volts DC; 1,800 volts AC.

Conductor leads 124U and 124L are made of 20 gauge test probe wire with 20,000 volt capacity rubber insulation to prevent accidental shorts and to provide sufficient flexibility so as not to fatigue and break in service. Conductor lead 190 is made of heavy gauge wire or cable, preferably of at least 10 gauge to minimize losses and noise in the circuit. Preferably "an idiot light" R is coupled across the input power leads 202, 204 to indicate, when on, that leads 202 and 204 and the system are energized.

In the operation of the spark discharge circuitry of FIG. 7, assuming none of the paddles 100 and 102 are in contact with any of the wheel workpieces, leads 208 and 210 being coupled across the parallel RC capacitor storage branches (resistor 230 and capacitor 234) will charge each capacitor 234 up to a voltage potential rectified from secondary 206 of the tranformer T within the time constant of the RC circuit. When a given wheel, such as wheel WU shown in FIG. 4, makes contact with an associated wiper 118 at its leading rim flange 94, a capacitor discharge circuit will be completed (from the positive side of capacitor 234 to ground lead 210) via the associated positive lead 124 U of wiper 118, rim flange 94, through the electrically conductive metal of the wheel to one or more of the four contact points of the wheel with support rods 82, 84 of carrier 50, thence returning through the carrier frame work 60 and 62, hanger strap 56, links 52 and 54, trolley arm 38 to bus bar 162, and finally through main ground cable 190. This "zapper" circuit is again opened as soon as rim flange 94 wipes clear of contact with the associated wiper 118. The capacitor discharge branch circuit then at least partially recharges prior to the next contact with the wheel at trailing rim flange 92, whereupon the spark discharge circuit is again completed in the same manner. The step-up voltage and the RC charge time constant of each capacitor discharge branch circuit is preferably designed to permit recharge to a predetermined minimum value in the time interval between each break of contact with trailing wheel flange 92 of one wheel and initial contact with lead flange 94 of the next successive wheel.

When main power to the system is turned off, light R is extinguished and relay coil CR de-energized. Relay contacts 216 will thereupon close, thereby completing a safety branch circuit through which all of the capacitors 224, 226 and 234 will be discharged for safety reasons during system shut-down. Resistor 215 in this branch prevents overloading of diodes 212 when the main power switch is turned on, since there is a slight delay in opening of relay contacts 216 as relay coil is initially being energized.

From the foregoing, it will now be more apparent that in the overall operation of the method, system, circuitry and apparatus of the present invention, each wheel prior to transisting the electrodeposition line will be placed a total of ten times in DC circuit with a capacitor discharge unit. Thus, the four possible electrical contact points of each wheel with its associated carrier 50 via its dual flanges 92, 94 rods 82, 84 will have ten successive applications of high DC voltage applied across them by the time the wheel leaves the spark discharge station. If any one or more of the four support points of mechanical contact between a given wheel and rods 82, 84 provide a clean connection i.e. free of a resistive paint coating, the wheel can be considered well grounded on its associated carrier 50 and not subject to a "no-paint" problem downstream in the electrodeposition bath. In this instance it has been found that when a paddle makes contact with such an aleady well-grounded wheel, there is a characteristic audible report, characterized as a powerful "zap".

However, assuming the problem of paint build-up on rods 82, 84 exists, thereby providing sufficient electrical insulation between the rim flanges 92, 94 and support rods 82, 84 to exceed the maximum interface resistivity for proper electrodeposition, when the wheel is struck by its associated paddle 100, 102 a different characteristic sound is heard, more like the crackle of an outdoor electrostatic insect killer. With such a paint-coated carrier, upon making connection of the capacitor discharge circuit via the associated paddle with the wheel rim flanges, the wheel provides four parallel paths to carrier 50 via rods 82, 84. Hence the voltage across each resistive point interface at the four support points is substantially equal. Whichever of these four contact points has the lowest resistance, i.e. least thickness of paint build-up, tends to break down and complete a circuit by arc discharge between the associated wheel flange and rod. In some instances, depending on the severity of paint build-up, the first "zap" by paddle contact to the wheel may be sufficient to permit the arc discharge to completely carbonize and even forcefully remove the paint build-up. This removal effect may be termed a "blow-off" action and is believed to be caused by the explosive-type effect caused by the heavy density current and spark blasting observed during the creation of the arc discharge. In this event the weight of the wheel will cause it to settle into metal-to-metal contact with the rod, thereby making a good electrical connection for subsequent efficient electrodeposition coating of the wheel. However, if after the first "zap" the heat and/or force of the spark discharge current is not sufficient to completely carbonize and/or blow-off the paint at the interface, it will nevertheless lower the interface resistance. Hence, on each of the following nine successive "zaps", further paint break down, carbonization and/or blow-off will occur, insuring upon exit of the wheel from the spark discharge paddle array that the electrical contact grounding of wheel to its associated carrier through one or more of the four carrier support points will be significantly improved.

The wheel need only make good contact through one of its work contact points to insure a good coating in the electrodeposition bath and hence the existence of four possible electrical contact points per wheel enhances reliability of the system. Previously, this four point-per-wheel contact contributed to poor electrical contact or wheel-to-basket grounding due to less weight bearing at each contact point. However, a basket-type carrier has been used for ease of wheel handling, particularly for deep tank coating with the wheels supported in vertically tandem pairs.

In actual operation of a working embodiment of the present invention utilized for electrocoating steel passenger car wheels with a water-based acrylic paint as illustrated herein, application of 1,000 volts DC to paddles 100, 102 generally has been found to be sufficient to insure carrier-to-wheel electrical contact, although application of higher voltages such as 2,000 volts, is advantageous to decrease recharge time and also may be used to break through very thick paint if the same exists on the edges of the carriers or baskets 50. Moreover, although application of a higher voltage for a longer time period might insure paint breakthrough with only one contact per wheel, making of multiple successive spark discharge circuits through the wheel as it is traveling through the spark discharge station permits the use of the lower applied voltages, reduces wear and damage to the system components and produces a less visible contact spot on the outer edge of the wheel rim flanges. In any event it has been found the resistivity of the wheel-carrier paint interface is lowered with every discharge. It is also to be understood that the spark discharge through the wheel-carrier paint interface may establish adequate conductivity either by carbonization or by paint blow away. The particular magnitude of applied DC voltage to be supplied to paddles 100, 102 can, of course, be varied by system design or regulators to suit process requirements. The minimum level of applied voltage, however, should be at least slightly in excess of the minimum breakdown voltage of the coating build-up on the carrier-wheel interface. It is also preferred to minimize and stabilize wheel conveyor travel between the "zapper" work station and coating work station to maintain the wheel flanges on the arc discharge zones of its associated carrier rods. Although five paddles in a row has been found to be sufficient to greatly reduce "no-paint" and "thin" paint problems in the illustrated embodiment, more or less paddles may be employed or may be required to optimize process performance versus cost for any given coating environment and application.

The system of the invention thus overcomes the problem of poor electrical contact between the workpiece and carrier which otherwise would result in either no paint being deposited on the workpiece or a thin or otherwise defective coating on the workpiece. The system thus provides substantial process cost savings. For example, in the case of the automotive wheel painting line illustrated herein, it should be understood that a defectively painted wheel cannot be merely just re-run through the paint process to provide a good part. Instead, the defectively coated wheel has to be taken out of the line and the entire paint coating removed before the wheel can be reprocessed through the coating line. This can result in a substantial salvage cost per wheel. It is also to be understood that the present system has the advantage of cleaning the contact points on the work carrier system regardless of the position of an individual wheel on its associated carrier 50 because circuit contact for paint interface removal is made through the wheel where ever the wheel is resting on carrier rods 82 and 84. The aforementioned reliability advantage of four possible contact points is also obtained with this set up; turning this reduced weight-per-contact problem set-up into an advantage in the system.

Figure 8:
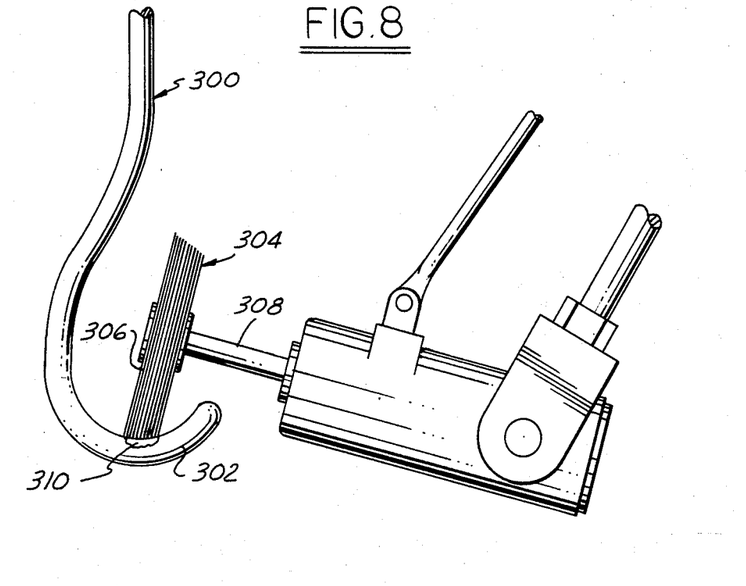
FIG. 8 is a fragmentary semi-schematic vertical elevational view of a modified work-carrying hanger and associated modified spark discharge cleaning apparatus also in accordance with the present invention.

However, it is to be understood that the method, circuitry, apparatus and system of the present invention can also be applied in an alternative manner to directly arc discharge clean the work support contact point or points on the carrier when the same is empty of a workpiece. Such an alternative embodiment of the system employs successive wiper strikes on a predetermined zone of each of the support rods 82 and 84, and requires a more sophisticated paddle contact apparatus such as multiplicity of revolvable, electrically-conductive hard wire brushes arranged in a successive multiple strike system as in the illustrated embodiment. Programmed control of robot carried wiper brushes enables timed reach into the zones of rods 82 and 84 to be cleaned by arc discharge. Alternatively, and as shown in FIG. 8, such direct cleaning of the work carrier is facilitated by employing a conventional hook type carrier 300 such as set forth in the aforementioned prior art patents with the hanging crook portion 300 of the hook, i.e. that portion which is to make metal-to-metal contact with a wheel or other workpiece suspended on the hook, passing through a spark discharge clean out station. The exemplary embodiment of FIG. 8 employed for this purpose utilizes a clean out wire brush 304 operably electrically coupled into the capacitor discharge circuit of the invention in the manner of paddles 100, 102 and suitably supported so that the hooks when empty pass by the brush or brushes and make contact with the same, either once or through a succession of such brushes, to insure that the interface subsequently established between workpiece and hook when loading workpieces is returned to a good electrically conductive condition prior to electrocoating of the workpieces. Brush 304 comprises a circular radiating array of steel bristles 306 mounted on a stationarily positioned spindle 308 and rotatably driven to spin against surface area 310 of crook 300 as the latter passes into and out of engagement with brush 304. Such contact will cause a multiple arc discharge from bristles 306 into crook 300 to carbonize, burn-away and/or mechanically brush clean the work contact surface 310 of hook 300 prior to loading of a workpiece thereon. Such direct arc discharge cleaning of the workpiece carriers is advantageous in those manufacturing facilities requiring a remote, isolated work station to accommodate the electrical arcing and sparks utilized in such carrier cleaning, as where flamable or explosive vapors may exist in the coating area.

From the foregoing description, it will now be apparent that the method, apparatus, system and circuitry of the present invention provides many advantages over the prior art. The number of "no paints" and "thin paints" in the wheel electrodeposition coating line have been significantly reduced, thus providing a corresponding reduction in scrap loss and salvage costs. Moreover, this has been accomplished with a relatively simple and inexpensive apparatus and circuitry, in a relatively centralized work station set-up requiring no change in the work conveyor or hanger construction. The system eliminates the need for an in-line burn-off oven station for burning off paint on every pass of the carrier in the conveyor cycle, and greatly reduces the need for removal and separate cleaning or replacement of the hangers or carriers. The system is readily adaptable to an electrocoating conveyor system which has only a one-way transit through the bath, and also eliminates the need to provide special hangers or devices, or modifications to the hangers, in order to overcome the work carrier paint deposition problem.

The system of the invention also lends itself to improved quality control analysis and maintenance. Suitable sound pick-ups (microphones) and associated circuitry may be mounted along the line of zapper paddles to monitor the audible character of the arc discharges. Alternatively or in combination therewith, conventional voltage, resistance and/or current monitors and recorders may be readily incorporated into the capacitor discharge circuitry of the system to provide monitoring and read out of the quality of the wheel-to-carrier electrical contact interface by monitoring any of the usual electrical parameter seen through the interface, both initially and as the wheel progresses down, and/or after exit from the paddle line. Such a monitoring set up identifies in real time and allows removal of workpieces from the carriers after passing through the paddle rows for recycling through the paddle rows if the appropriate quality control parameters are not sensed after the workpiece exits from the paddle array.

Although such conventional interface condition monitors can be incorporated directly into the capacitor discharge circuitry of the illustrated system, simplification of such components is obtained by coupling the same to a separate wiper paddle (not shown) constructed the same as paddles 100, 102 but mounted as a downstream add-on just beyond the last "zapper" paddle 100 and 102 in each of the upper and lower rows of paddles in the work station. As shown in the exemplary embodiment illustrated in FIGS. 9 and 10, this sensor wiper can be coupled to the same rectified power supply leads 208 and 210 in parallel with the main capacitor discharge network. The sensor circuit of FIG. 9 thus comprises another RC network consisting of a resistor 230' and capacitor 234' but employed for the purpose of filtering the voltage applied to the sensor paddle. A large limiting resistor 312 is connected at 314 between capacitor 234' and resistor 230, and via lead 316 is connected in series with the sensor paddle to apply high voltage and minimal current across the carrier-workpiece interface. A suitable voltmeter 318 is connected across leads 316 and 210 in parallel with the interface, and associated conventional recording and signal devices (not shown) are also connected in this sensor circuit to identify "go" or "no-go" workpieces on the associated carriers.

Figure 9:
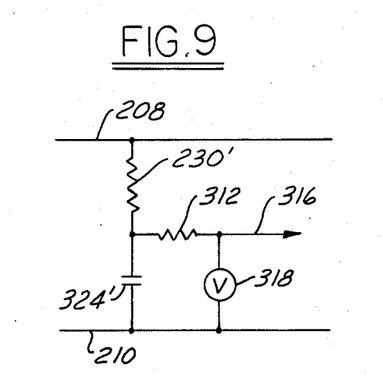
FIG. 9 is a fragmentary schematic circuit diagram illustrating an add-on monitoring or test circuit associated with a test or sensor paddle also in accordance with the present invention.
Figure 10:
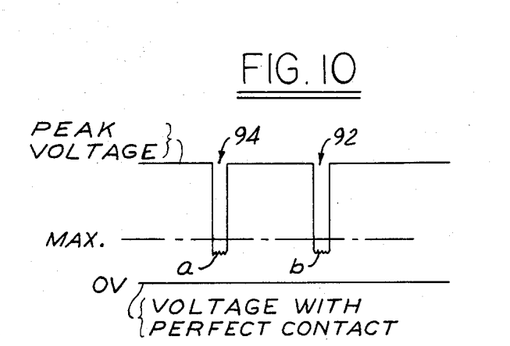
FIG. 10 is a wave form diagram illustrating an output characteristic of the test circuit of FIG. 9.

In the operation of the aforementioned quality control or monitoring system utilizing the circuitry described in conjunction with FIG. 9, after a wheel has traversed the row of five paddles 100 or 102 the same will then encounter the sensor wiper paddle which, upon successively striking the leading and trailing rim flanges 84 and 92, will apply successively two test voltages across the carrier-workpiece interface. Referring to FIG. 10, which is a wave form diagram plotting the voltage read-out from meter 318 against time, it will be seen that a given wheel traversing a sensor paddle will produce a minimum voltage reading "a" upon contact with rim flange 94, and another minimum voltage value "b" when the trailing rim flange 92 subsequently strikes the sensor paddle. If the votlage values "a" and "b" are less than a given maximum value indicated by the dash-dot line in FIG. 10, the wheel-carrier interface electrical resistivity will have a value low enough so as to ensure proper electrocoating during subsequent passing of the wheel through the electrocoating treatment bath. If values "a" and "b" should exceed the maximum accepted quality control test value, the wheel is then removed from the work carrier prior to passage through the treatment bath and recycled through the array of paddles 100 or 102.

Figure 11:
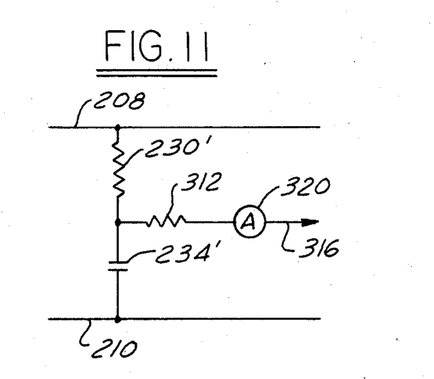
FIG. 11 is a fragmentary schematic circuit diagram illustrating another embodiment of an add-on monitoring circuit which may be substituted for the circuit of FIG. 9.
Figure 12:
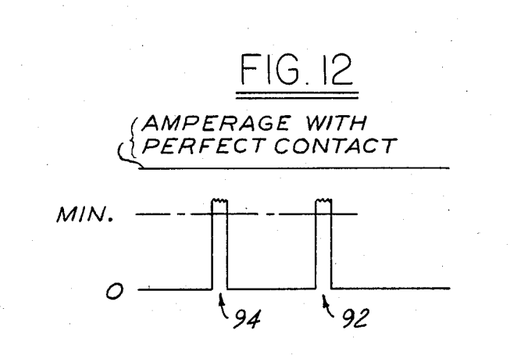
FIG. 12 is a wave form diagram illustrating an output characteristic of the test circuit of FIG. 11.

FIGS. 11 and 12 illustrate an alternative sensor circuitry in which an ammeter 320 is substituted for volt meter 318 by connecting the same in series between resistor 312 and lead 316 so as to measure the current flow through the workpiece or wheel-carrier interface upon contact of the sensor paddle with the wheel rim flanges. Thus, the output in this case will be a measure of current flow through the interface rather than voltage drop thereacross. Hence, as illustrated in FIG. 12, if the read-out of the current flow versus time reaches a maximum value during paddle-flange contact, such as "a'" illustrated for contact with flange 94 and "b'" illustrated for flange 92 having at least a value exceeding some predetermined minimum current valve indicated by the dash-dot line in FIG. 12, the wheel is acceptable or "go", whereas readout values falling below this minimum acceptable level will indicate an unsatisfactory interface conductivity or resistivity condition. In the latter event the wheel, as indicated above, is removed from the carrier and recycled through the array of paddles 100 or 102 before being allowed to enter the treatment bath.

In addition to the aforementioned advantages of the system of the invention, it is to be understood that the application of the spark discharge to a workpiece supported on an associated carrier, or alternatively directly to an empty carrier, as described above, also is effective to improve electrical conductivity through the various mechanical joints and associated bolts of the conveyor supported carrier frame work, such as the bolts connecting the straps 52 and 54 (FIG. 2) to hanger strap 56 and to the associated yoke arms 38 and 40. Due to the adverse environment typically encountered by the conveyor work-carriers, such as water cleaning stations as well as coating and other surface treatment stations, in the transit of a carrier through the conveyor route cycle, such joints tend to corrode and thereby accumulate an oxide coating which increases the electrical resistance through such joints. Since such joints or articulate connections are typically found in the electrocating circuit which includes the work-carrier, they can also contribute to the "poor paint" or "thin paint" problem during electrocoating. In accordance with the present invention it has been found that the application of the high voltage, either directly or indirectly via the workpieces, to the workpiece carrier will also produce an arc discharge at these joint interfaces in the carrier hanger articulation points which improves the electrical conductivity therethrough, thus eliminating or greatly reducing the need for de-oxiding cleaning of the articulated joints and joint structure of the work carrier, while further helping to overcome the poor paint and thin paint problem.

It is also to be understood that in the particular embodiment illustrated herein contact of the wheel flanges 92 and 94 with the "zapper" paddles 100 or 102 does leave a small but visible marking on the steel surface of the workpiece. However, after painting of the wheels these contact marks are no longer visible. Moreover, test results on wheels processed by the system of the invention have shown that the contact marks left by the paddles 100 or 102 do not produce any form of stress riser in the wheel part. Preferably paddles 100 and 102 are, as described previously, only lightly biased to their interference position with the travel path of the workpieces. Such light biasing and light contact of the paddle with the workpieces has been found quite adequate to produce the required spark discharge through the carrier-workpiece interface (and through the articulated joints of the work-carrier). Thus, for example, in an alternative set-up (not shown), paddles 100 or 102 may be pivotally supported so as to hang down with their free ends in an interference position with the workpiece travel path, and gravity alone relied upon as the source of paddle return biasing force. By so utilizing only a light contact force relative to the paddles 100 and 102, there is no danger of thumping or jarring a workpiece so as change its rest position on the associated carrier such that the workpiece no longer registers with the arc-discharge-conditioned workpiece-carrier interface. As indicated previously, if the workpiece so moves on the carrier after passage past paddles 100 or 102, some or all of the benefit of spark discharge conditioning may be lost. In this regard, in certain applications, if the workpiece happens to be precariously supported on an associated carrier, i.e., in an unstable rest position, a small vibration of the carrier and/or workpiece could cause the workpiece to shift on the carrier. In such applications, it therefore may be beneficial to vibrate or shake the carriers with the workpieces suspended thereon in order to settle the parts or workpieces into a more stable position onto their associated carriers before the same transit the spark discharge paddle station.

It has also been found that with the system of the invention, paddle contact only has to be lightly made on any place of the workpiece to be electrocoated. Therefore, a lightly biased or loaded paddle-workpiece contact provided by the system of the invention is well suited to odd-size or odd-shape workpieces, as well as to workpieces which vary in size and shape from carrier to carrier. It is also to be understood that, in general, the problem of paint or coating build-up on the carrier, resulting in the unduly high resistance through the carrier-workpiece interface, is less severe in the case of a heavy workpiece or part suspended on a single point hook type carrier. In such applications there is a good chance that the workpiece, due to its weight and hence high force tending to urge the workpiece into engagement with the suspension point of the carrier, will alone cause the workpiece to break through the paint built-up in this interface and make metal-to-metal direct electrical contact. However, in applications involving relatively light weight workpieces, or workpieces having multiple point contact with the carrier, as is in the case of the wheels WU and WL upon carriers 50 illustrated herein, the workpiece is much less likely to break through the paint build-up by itself merely due to its weight. Hence, the system of the invention is particularly beneficial for overcoming the "poor paint" or "thin paint" problems in these low pressure contact applications, although still quite useful in the aforementioned single point, heavy workpiece applications.

It is to be understood that, although the foregoing description and drawings describe and illustrate in detail various successful working embodiments of the present invention, to those skilled in the art to which the present invention relates the present disclosure will suggest many modifications in construction as well as widely differing embodiments and applications without thereby departing from the spirit and scope of the invention. The present invention, therefore, is intended to be limited only by the scope of the appended claims and the applicable prior art.

I claim:

1. System for removing coating material accumulated on carriers suspended from an overhead conveyor used to continuously move articles through a zone for applying coating to the articles, said system comprising, means for engaging the article or the carrier during transit thereof prior to entry of said zone, and circuit power supply means for supplying to said engaging means a predetermined voltage applicable upon engagement with the article or the carrier so as to produce an arc discharge at an article supporting surface area of the carrier sufficient to carbonize or burn away accumulated coating material from said surface area of the carrier in the course of such movement.

2. The system of claim 1 wherein the voltage applying engaging means comprises a series of wipers arranged in a row adjacent the path of travel of the carrier adapted for successive voltage application engagements therewith to progressively graphitize or burn away the accumulated coating material from said surface area of the carrier.

3. The method of improving electrical conductivity of contact between an electrically conductive workpiece and an electrically conductive work carrier while the workpiece is supported on a work carrier prior to moving the workpiece through an electrocoating treatment zone while supported by said work carrier comprising the steps of:
   (1) suspending the workpiece on the carrier prior to entry into the treatment zone, and
   (2) impressing a high voltage on the suspended workpiece prior to entry into the zone to cause an arc discharge between the workpiece and carrier so as to carbonize or burn away any treatment coating accumulated on the hanger from previous passage through the treatment zone to thereby increase the electrical conductivity of the interface between the workpiece and the carrier prior to entry of the workpiece into the electrocoating treatment zone.

4. The method as set forth in claim 3 wherein said step (2) of impressing a voltage on said workpiece comprises:
   (a) passing said workpiece past an electrically conductive wiper contact during transit on said carrier toward said zone to cause contact with said wiper as the workpiece travels thereby,
   (b) energizing said wiper with a high voltage from a capacitor discharge power supply prior to contact with said workpiece, and
   (c) discharging said power supply from said wiper into said workpiece as a result of contact therebetween during transit of the workpiece past said wiper.

5. The method as set forth in claim 4, wherein said workpiece is caused to travel past a series of wipers adapted to provide a successive repetition of steps (a), (b) and (c) to produce a successive series of spark arc discharges across the workpiece-carrier interface prior to entry of the workpiece into the zone.

6. Equipment for workpiece surface treatment of the type requiring electrical conduction through the workpiece to effect the treatment comprising,
   metallic supporting elements for workpieces subjected to treatment and a conveyor for moving the supporting elements through a treatment station, in combination with,
   a wiper element disposed adjacent the path of travel of the workpieces during transit thereof prior to entry into the treatment,
   a capacitor discharge circuit and power source coupled thereto operable coupled to said wiper element, and
   associated circuit means including said workpiece and said supporting elements operative to complete a spark discharge path with said discharge circuit via the wiper element upon engagement thereof with the workpiece for either carbonizing or burning off of any material on the work supporting element creating a resistive barrier between the workpiece and associated supporting element to thereby improve electrically conductivity between the workpiece and the supporting element during subjection thereof to the surface treatment.

7. In electrocoating equipment having a conveyor rail with a trolley movable therealong for carrying parts through a bath to be electrocoated, said trolley comprising wheels, arms dependent from said wheels below said rail and a part carrier suspended from said arms, and drive means for the trolley, the improvement comprising shoe means electrically connected to one side of a capacitor discharge power supply system, said shoe means being disposed in sliding electrical contact with at least one of said arms of said trolley and extending along the path of travel thereof prior to transitting the electrocoating bath of said equipment, said shoe means being yieldably biased into such contact with said arm, said power supply system including wiper means connected to the other side of said power supply system for applying a relatively high voltage to a workpiece while the same is carried on said part carrier to cause a spark discharge via the interface of said workpiece and part carrier to improve the electrical contact therebetween.

8. The electrocoating equipment of claim 7 wherein said wiper means comprises a contact member yieldably biased into contact position wherein said member is adapted to be struck by the workpiece as the same travels on said conveyor rail while supported by said part carrier.

9. The electrocoating equipment of claim 8 wherein said wiper means comprises a series of yieldably biased paddles arranged in a row spaced along the path of travel of the workpiece on said part carrier prior to entry thereof into the electrocoating bath.

10. The electrocoating equipment of claim 9 wherein said carrier comprises a basket having a pair of horizontal spaced work support rods therein, and said workpiece comprises a metallic wheel having axially spaced radially protruding rim flanges resting with a four point contact on said rods.

11. In a method of coating wherein electrically conductive objects transported by and electrically connected to a conveyor part carrier are successively passed through an aqueous bath having organic film-forming material dispersed therein and a first electrode in contact therewith, each of said objects and said part carrier while passing through said bath serving as a second electrode, and providing a unidirectional flow of electrical energy between said first electrode and said second electrode until a substantially water insoluble coating of said material is deposited upon said second electrode, the improvement which comprises causing each of said objects while on an associated part carrier to pass prior to entry into contact with said bath through a spark discharge zone wherein a predetermined difference of electric potential is provided between said object and said part carrier, applying said electrical potential difference across said object and part carrier to cause a flow of electrical energy between said object and said part carrier from said difference of potential while said object is in movement through said zone, and utilizing said flow between object and conveyor when it exceeds a predetermined value to breakdown the electrical resistance of any of the film-forming material existing in the object-to-part carrier interface prior to entry of the object and the associated carrier into the bath.

12. Apparatus for use in coating electrically conductive objects comprising in combination an electrically conductive coating tank adapted to contain an aqueous bath having organic film-forming material dispersed therein and to contain a first electrode, conveyor means for transporting a line of electrically conductive objects into said tank, means for providing a flow of electrical energy between each of said objects and said first electrode when the object is in contact with said bath, means for providing a difference of electric potential between each of said objects and said conveyor prior to the entry of each such object into said tank and means for applying said potential difference across the object-conveyor interface to cause a flow of electrical energy between each such object and said conveyor while said object is in movement to said tank of sufficient magnitude and duration to break-down the electrical resistance of any of the film forming material existing in the object-conveyor interface prior to entry into the tank.

13. System for removing electrically insulative material accumulated on carriers suspended from an overhead conveyor used to continuously move articles through a zone for applying an electrical surface treatment to the articles by electrical conduction through the workpiece and associated carrier, said system comprising,
   means for making electrical contact with the article or the carrier during transit thereof prior to entry of said zone, and
   circuit power supply means for supplying to said contact means a predetermined voltage applicable upon engagement with the article or the carrier so as to produce an arc discharge across a metal-to-metal interface surface area of the carrier located in electrical series circuit with the workpiece during the surface treatment thereof in said zone, said predetermined voltage being of sufficient magnitude to carbonize or burn away accumulated insulative material from said interface of the carrier in the course of such movement.

14. The system of claim 13 wherein the voltage applying contact means comprises wire brush means arranged in interference position in the path of travel of the carrier adapted for voltage application engagement therewith to carbonize or burn away accumulated insulating material from an article supporting surface area of the carrier while the carrier is empty of the associated workpiece.

15. The method of improving electrical conductivity of support contact between an electrically conductive workpiece and an electrically conductive work carrier prior to moving the workpiece through an electrocoating treatment zone while supported by said work carrier comprising the steps of:
   (1) moving the workpiece carrier through an arc discharge station prior to entry into the electrocoating treatment zone, and
   (2) in said arc discharge station impressing a high voltage across a surface area of the carrier on which the workpiece is suspended in said treatment zone to cause an arc discharge so as to carbonize or burn away any treatment coating accumulated on said surface area from previous passage through the treatment zone to thereby increase the electrical conductivity of the interface between the workpiece and the carrier prior to entry of the workpiece into the electrocoating treatment zone.

16. The method as set forth in claim 15 wherein said step (2) of impressing a voltage on said workpiece contact surface area comprises:

(a) passing said carrier past an electrically conductive wiper contact to cause contact of said surface area with said wiper as the workpiece travels thereby, (b) energizing said wiper with a high voltage from a capacitor discharge power supply prior to contact with said workpiece, and (c) discharging said power supply from said wiper into said carrier at said surface area as a result of contact therebetween during transit of the carrier past said wiper.

17. The method as set forth in claim 16, wherein said carrier is caused to travel past a series of wipers adapted to provide a successive repetition of steps (a), (b) and (c) to produce a successive series of spark arc discharges across the workpiece-carrier interface surface area prior to entry of the carrier into the treatment zone.

18. Equipment for workpiece surface treatment of the type requiring electrical conduction through the workpiece to effect the treatment comprising, metallic supporting elements for workpieces subjected to treatment and a conveyor for moving the supporting elements through a treatment station, in combination with a wiper element disposed adjacent the path of travel of the workpieces during transit thereof prior to entry into the treatment, a capacitor discharge circuit and power source coupled thereto operably coupled to said wiper element, and associated circuit means including said workpiece and said supporting elements operative to complete a spark discharge path with said discharge circuit via the wiper element upon engagement thereof with the workpiece for either carbonizing or burning off of any material on the work supporting element creating a resistive barrier between the workpiece and associated supporting element to thereby improve electrically conductivity between the workpiece and the supporting element during subjection thereof to the surface treatment.

19. In surface treatment equipment having a conveyor rail with a trolley movable therealong for carrying parts through a zone for applying an electrically induced surface treatment to the parts by electrical conduction through the trolley means, said trolley comprising rail tracking wheels, arm means dependent from said wheels below said rail and a part carrier suspended via articulated joint structure from said arm means, and drive means for the trolley, the improvement comprising shoe means electrically connected to one side of a capacitor discharge power supply system, said shoe means being disposed in sliding electrical contact with at least one of said arm means of said trolley and extending along the path of travel thereof prior to transmitting the electrocoating bath of said equipment, said shoe means being yieldably biased into such contact with said arm means, said power supply system including contact means connected to the other side of said power supply system for applying a relatively high voltage to said part carrier to cause a spark discharge via the interface of said articulated joint structure to improve the electrical contact.

20. The surface treatment equipment of claim 19, wherein said contact means comprises a contact member yieldably movable out of contact position wherein said member is adapted to be struck by the carrier while empty or by the workpiece while supported on the carrier as the same travels on said conveyor rail prior to entry into said surface treatment zone.

21. The electrocoating equipment of claim 20, wherein said contact means comprises a series of yieldably biased paddles arranged in a row spaced along the path of travel of the workpiece on said part carrier for yieldably contacting the workpiece prior to entry thereof into the electrocoating bath, and further including a quality control test apparatus comprising a sensor paddle also located in the path of travel of said workpieces between the last of said paddles and said treatment zone and adapted to be struck by the workpiece while supported on said trolley, and test circuit means connected across said sensor paddle and said shoe means for indicating a go or no-go condition of the electrical conductivity of the workpiece-carrier interface upon contact of the sensor paddle with said workpiece.

22. In a method of coating wherein electrically conductive objects transported by and electrically connected to a conveyor part carrier are successively passed through an aqueous bath having organic film-forming material dispersed therein and a first electrode in contact therewith, each of said objects and said part carrier while passing through said bath serving as a second electrode, and providing a unidirectional flow of electrical energy between said first electrode and said second electrode until a substantially water insoluble coating of said material is deposited upon said second electrode, the improvement which comprises causing each of said objects while on an associated part carrier to pass prior to entry into contact with said bath through a spark discharge zone wherein a predetermined differece of electric potential is provided between said object and said part carrier, applying said electrical potential difference across said object and part carrier to cause a flow of electrical energy between said object and said part carrier from said difference of potential during passage of said object through said zone, said flow between object and conveyor being of sufficient magnitude and duration to reduce the electrical resistance of the object-to-part carrier interface prior to entry of the object and the associated carrier into the bath, and thereafter causing each of said objects while on the associated part carrier to pass through an inspection test zone prior to entry into contact with said bath, causing a second limited test flow of electrical energy between said object and said part carrier, and utilizing said second flow to measure the conductivity or resistivity of the object-to-part carrier interface for quality control purposes.

* * * * *